United States Patent
Grobe et al.

(10) Patent No.: US 8,897,642 B2
(45) Date of Patent: Nov. 25, 2014

(54) REMOTE NODE AND NETWORK ARCHITECTURE AND DATA TRANSMISSION METHOD FOR A FIBER-OPTIC NETWORK, ESPECIALLY FOR LOW BIT-RATE DATA TRANSMISSION

(75) Inventors: Klaus Grobe, Planegg (DE); Henning Hinderthur, Finning (DE)

(73) Assignee: ADVA AG Optical Networking, Meiningen (DE)

( * ) Notice: Subject to any disclaimer, the term of this patent is extended or adjusted under 35 U.S.C. 154(b) by 319 days.

(21) Appl. No.: 13/324,706

(22) Filed: Dec. 13, 2011

(65) Prior Publication Data

US 2012/0328293 A1    Dec. 27, 2012

(30) Foreign Application Priority Data

Jun. 27, 2011    (EP) .................................... 11401537

(51) Int. Cl.
*H04B 10/20* (2006.01)
*H04J 14/02* (2006.01)
*H04B 10/278* (2013.01)
*H04B 10/272* (2013.01)

(52) U.S. Cl.
CPC ............ *H04B 10/272* (2013.01); *H04B 10/278* (2013.01)
USPC ................... 398/58; 398/43; 398/67; 398/59; 398/72

(58) Field of Classification Search
CPC .. H04B 10/278; H04B 10/502; H04B 10/695; H04B 10/2931; H04B 10/272; H04L 69/40
USPC .................................................. 398/58, 43, 67
See application file for complete search history.

(56) References Cited

U.S. PATENT DOCUMENTS

| | | | | |
|---|---|---|---|---|
| 5,274,673 A * | 12/1993 | Kaharu et al. | ................. | 375/282 |
| 5,396,359 A * | 3/1995 | Abramovitz | ..................... | 398/51 |
| 7,095,958 B1 * | 8/2006 | Woodward | ..................... | 398/72 |
| 7,369,765 B2 * | 5/2008 | Aoki et al. | ....................... | 398/45 |
| 7,603,035 B2 * | 10/2009 | Kinoshita et al. | ............... | 398/59 |
| 8,571,409 B1 * | 10/2013 | Wang et al. | ..................... | 398/59 |
| 2002/0030864 A1 * | 3/2002 | Chaudhuri et al. | ........... | 359/110 |
| 2008/0013951 A1 * | 1/2008 | Song et al. | ....................... | 398/72 |
| 2012/0328293 A1 * | 12/2012 | Grobe et al. | ..................... | 398/58 |
| 2013/0094857 A1 * | 4/2013 | Hinderthur et al. | ............. | 398/58 |

FOREIGN PATENT DOCUMENTS

| EP | 0271196 A1 | 6/1988 |
|---|---|---|
| EP | 2249499 A1 | 11/2010 |

* cited by examiner

*Primary Examiner* — Oommen Jacob
(74) *Attorney, Agent, or Firm* — The Webb Law Firm

(57) ABSTRACT

The invention relates to a remote node architecture for a fiber-optic network, especially for low bit-rate data transmission, the fiber-optic network comprising a central node and a plurality of remote nodes serially connected to each other or to the central node, respectively, the central node and the remote node being capable of communicating by means of digital optical signals created by the central node or a respective remote node, each digital optical signal comprising a data frame.

16 Claims, 4 Drawing Sheets

REMOTE NODE AND NETWORK ARCHITECTURE AND DATA TRANSMISSION METHOD FOR A FIBER-OPTIC NETWORK, ESPECIALLY FOR LOW BIT-RATE DATA TRANSMISSION

BACKGROUND OF THE INVENTION

1. Field of the Invention

The invention relates to a remote node architecture for a fiber-optic network, especially for low bit-rate data transmission, and to a fiber-optic network architecture comprising such remote node architectures as well as to a data transmission method suitable therefore.

2. Description of Related Art

Recently, especially in the context of the so-called "smart metering" application, public or private utility companies have started to deploy their own communication networks. These networks (referred to as sensor networks in the following) may, for example, connect commercial end users to the different levels of voltage transformer stations. These may be low voltage, medium voltage or high voltage transformers or even the respective energy dispatch center. To a wide extent, optical fiber infrastructure will be used for these communication networks. The whole network setup and hierarchy is quite similar to a telecommunication application. However, the actual bandwidth demand per end customer is significantly lower. In particular, the network area on the level of low voltage transformers is different to a telecommunication company's transmission network, especially with respect to the bandwidth required and desired network topology. Typically, a data transmission rate of a few Mbit/s per low voltage transformer node will be sufficient, and relatively large sub-network domains of up to 100 nodes in a linear bus geometry may be advantageous as a physical network topology. Of course, also a sufficiently high availability of the required network connections including fiber protection is desirable.

As a linear bus geometry or a physical linear bus architecture, respectively, is desirable, a classic time division multiplex (TDM) network, for example a network according to the synchronous optical network (SONET) standard or the newer synchronous digital hierarchy (SDH) standard, could be chosen for this data transmission application. A TDM network would meet the requirements as to data transmission rate and the network nodes with its East/West interface structure would easily enable to realize the bus structure. However, as such a sensor network should be realizable and maintainable at acceptable low costs the classic TDM structure (SONET/SDH) and the known structures for suitable network nodes are too complex and too expensive.

It is thus an object of the present invention to provide a remote node architecture for a fiber-optic network having a linear bus structure with a high number of network nodes, especially for low bit-rate data transmission, which reveals a simple structure that is realizable at low cost. It is a further object of the invention to provide a fiber-optic network architecture comprising such remote node architectures and a method for transmitting digital data in a fiber-optic network having a respective network architecture.

SUMMARY OF THE INVENTION

The invention is based on the finding that optically passing through the digital optical signal to be transmitted through each of the remote nodes on its way between a selected one of the remote nodes and the central node or vice versa, which results in realizing a linear fiber-optic bus structure, and (at any rate or if necessary due to signal deterioration) additionally creating an echo signal in one or more (or all) remote nodes passing through the transmit signal (and of course the echo signals of remote nodes upstream the signal path) is advantageous to realize a data transmission requiring rather low bandwidth or bit rates, respectively. The digital optical signal is created as a burst-like signal having a predefined length and a predefined data structure resulting in a digital data frame. The frame at least comprises load or information data and address data.

Thus, if the digital optical transmit signal is, on its way to the receiving remote or central node, deteriorated such that the signal quality cannot guarantee receiving the signal with the desired low bit error rate, it is possible to evaluate an echo signal that includes the same address and information data instead of the transmit signal.

In this way, it is possible to regenerate the signal to be transmitted with low effort, thus enabling a high number of nodes in a fiber-optic network with a linear bus structure.

The optical connection network preferably comprises passive optical components, only, and defines a western optical receiving path for supplying the digital optical signal received at the western optical connection port to the internal optical receiving port with a given portion of the optical power of the received digital optical signal, and an eastern optical receiving path for supplying the digital optical signal received at the eastern optical connection port to the internal optical receiving port with a given portion of the optical power of the received digital optical signal, and a western optical transmitting path for supplying a digital optical signal received at the internal optical transmitting port to the western optical connection port with at least a given portion of the optical power, and an eastern optical transmitting path for supplying a digital optical signal received at the internal optical transmitting port to the eastern optical connection port with at least a given portion of the optical power.

Using exclusively passive components for the connection network results in a simple and cheap design. Further, the reliability is improved and maintenance costs are reduced.

According to an embodiment of the invention, the controller device creates a digital optical echo signal if, after having received a digital optical transmit or echo signal, no digital optical transmit or echo signal is received within a predetermined time interval after the end of the digital optical signal received last, or if the controller device detects that the digital optical transmit or echo signal received last was created by a directly neighboring remote node or by the neighboring central node. In this way, the overlap or collision of signals on the transmission path is avoided.

In a preferred embodiment the controller device creates a digital optical echo signal for each digital optical transmit or echo signal received last in a series of one or more received digital optical transmit or echo signals having the same content data, only. In this way, the signal usually having the best signal quality is used for the creation of a corresponding echo signal as, in general, the signal received last is generated by the closest node.

In the receiving node (central node or remote node addressed), it might also be advantageous to receive and evaluate the transmit or echo signal which is received last as this echo signals is created by the remote node located nearest to the receiving node (at least if echo signal are created for transmit or echo signals being guided in the direction to the addressed node, only). Alternatively, the echo signal which reveals the best signal quality of a group of more than one echo signals for the same transmit signal received at the node addressed might be used to evaluate the respective data. For this purpose, the receiver unit or the controller unit may detect and evaluate a signal parameter linked to the signal quality, for example the optical signal power.

According to a further embodiment of the invention, the western and eastern optical transmitting paths and the pass-through path have an essentially wavelength-independent characteristic and are linked and designed in such a way that an optical transmit or echo signal supplied to the internal optical transmitting port is simultaneously supplied, with a respective portion of the optical power, to both the western and eastern optical connection ports. This enables the use of a single transceiver device, especially the use of a single transmitter unit, for creating digital optical transmit or echo signals to be supplied to the western and eastern connection port, respectively, which reduces the costs for a remote node.

Similarly, the western and eastern optical receiving and the pass-through path may have an essentially wavelength-independent characteristic and may be linked and designed in such a way that an optical transmit or echo signal supplied to the western or eastern optical connection port is simultaneously supplied, with a respective portion of the optical power, to the internal optical receiving port.

According to a preferred embodiment, the optical connection network comprises two optical 1×2 splitters, each having a common port and a first and a second splitting port, and a 2×2 optical coupler, the common ports of the optical 1×2 splitters defining or being connected to a respective one of the optical connection ports, the two first splitting ports of the optical 1×2 splitters being connected to each other and each of the second splitting ports of the optical 1×2 splitters being connected to a respective first and second port of the optical 2×2 coupler, a third and a fourth port of the optical 2×2 coupler defining or being connected to the internal optical receiving port and the internal optical transmitting port, respectively, the optical 2×2 coupler preferably being a 3 dB coupler.

This leads to an extremely simple and cheap design of the connection network and of the remote node structure as a whole, as the single transceiver device may comprise a simple broadband receiver unit and a simple optical transmitter unit.

Using this structure of a connection network, transmit signals and echo signals created in the remote node are optically split and simultaneously fed to the western and eastern connection port. This facilitates realizing a fiber or path protection if a second remote node is used at the opposite end of the optical bus structure.

With this design of the connection network and the remote node structure, it is advantageous if the controller device marks the data frame of a digital optical transmit signal created by the remote node and the created echo data frame of a digital optical echo signal created by the remote node as being a data frame or an echo data frame created or echoed by the remote node, and if the controller device does not create a digital optical echo signal if it detects, when receiving a digital optical signal which is not addressed to the remote node, that the respective data frame was created by the remote node itself.

With this method, it is avoided in case more than one remote node in a respective fiber-optic network generates echo signals that digital optical signals containing identical content data are "reflected" back and forth in an infinite loop.

According to another embodiment of the invention, the western and eastern optical transmitting paths, the western and eastern optical receivings and the optical pass-through path have a wavelength-dependent characteristic such that a digital optical transmit or echo signal supplied to the western optical connection port is passed through to the eastern optical connection port without being supplied to the internal optical receiving port if the signal supplied lies within a first wavelength band, a digital optical transmit or echo signal supplied to the western optical connection port is passed through to the eastern optical connection port with a given first power portion and simultaneously supplied to the internal optical receiving port with a given second power portion if the signal supplied lies within a second wavelength band, a digital optical transmit or echo signal supplied to the eastern optical connection port is passed through to the western optical connection port without being supplied to the internal optical receiving port if the signal supplied lies within the second wavelength band, a digital optical transmit or echo signal supplied to the eastern optical connection port is passed through to the western optical connection port with a given first power portion and simultaneously supplied to the internal optical receiving port with a given second power portion if the signal supplied lies within a first wavelength band, a digital optical transmit signal being created by the transmitter unit at the first wavelength and supplied to the internal optical transmitting port is supplied to the eastern optical connection port, only, and a digital optical transmit signal being created by the transmitter unit at the second wavelength and supplied to the internal optical transmitting port is supplied to the western optical connection port, only.

This remote node or connection network structure enables the remote node to receive signals supplied to the western or eastern connection port only if the respective signal reveals a wavelength (or wavelength band) that lies within a given band. Signals at other wavelengths (or wavelength bands) are directly passed through to the respective other connection port without being split and thus attenuated. As a result, an optical digital signal may pass a higher number of remote nodes without a need for regeneration (by creating an echo signal) than in a network structure including remote nodes, only, which are able to receive digital optical signals supplied to any of the connection ports irrespective of the signal wavelength (or signal bandwidth). Similarly, this wavelength dependent structure allows to create the digital optical transmit or echo signals at a specified wavelength (or wavelength band) such that they are output at a corresponding connection port, only.

A corresponding embodiment of a remote node structure thus comprises a transmitter unit that is controllable to create an optical signal at a first wavelength lying within the first wavelength band and a second wavelength lying within the second wavelength band. Additionally, the controller device is able to control the transmitter unit such that a transmit signal is created at the first wavelength if the transmit signal is addressed to the central node or a further remote node lying east of the remote node and the transmit signal is created at the second wavelength if the transmit signal is addressed to the central node or a further remote node lying west of the remote node, an echo signal for a transmit or echo signal at the second wavelength being supplied to the western optical connection port and thus supplied to and received at the internal optical receiving port is created at the first wavelength and thus supplied to the eastern optical connection port, and an echo signal for a transmit or echo signal at the first wavelength being supplied to the eastern optical connection port and thus supplied to and received at the internal optical receiving port is created at the second wavelength and thus supplied to the western optical connection port.

In this embodiment, the controller device preferably knows the structure of the fiber-optic network and can thus decide, whether the transmitter unit is to be controlled to transmit at the first or second wavelength in order to send the respective digital optical signal (transmit or echo signal) in the desired direction of the addressed central or remote node. If two central nodes are used in order to provide path protection, the controller device may detect or receive information that the originally used working path is interrupted (for example by detecting a loss-of-signal information) and then control the transmitter unit to switch to the respective other wavelength in order to supply the digital optical signal to be sent to the respective other optical connection port or transmission path, respectively.

In this way, the transmission of signals is selective with respect to the transmission direction and thus problems due to "reflecting" back and forth digital optical signals containing identical content data in an infinite loop in case more than one remote node generates echo signals that are simultaneously transmitted in both directions are avoided.

Alternatively, the transmitting unit may transmit both wavelengths simultaneously, so no wavelength control is necessary. Here, the advantage of a lower insertion loss for the passed-through signals still remains.

As the remote nodes in both of the afore-mentioned alternatives are able to receive signals at one of the two wavelengths (lying within the predefined wavelength bands), only, the central node must of course transmit an optical signal lying within the wavelength band that can be received by the remote node addressed. Of course, the receiving node (central or remote node), as already mentioned, comprises a receiver unit capable of receiving optical digital signals in both bands.

Although, only a communication between the central node a remote node has been described above, it its well within the scope of the present invention that also two remote nodes may communicate uni- or bidirectionally.

According to a further embodiment of the invention, the controller device may detect the optical or electrical signal quality of a received signal by evaluating one or more parameters linked to the optical or electrical signal quality and create an echo data frame if the signal quality is below a predefined threshold value, the parameters for the signal quality preferably being one of the optical or electrical signal power, the bit error rate or the existence of a coding violation. This reduces the number of echo signals which, in a simplified embodiment, may be created in each of the remote nodes receiving and passing through a digital optical signal (transmit or echo signal) in the direction of the central node or the remote node addressed by the respective digital optical signal.

BRIEF DESCRIPTION OF THE DRAWINGS

In the following, the invention will be described with reference to the embodiments apparent from the drawing. In the drawing, the Figures show.

DESCRIPTION OF THE PREFERRED EMBODIMENT(S)

Figure 1:
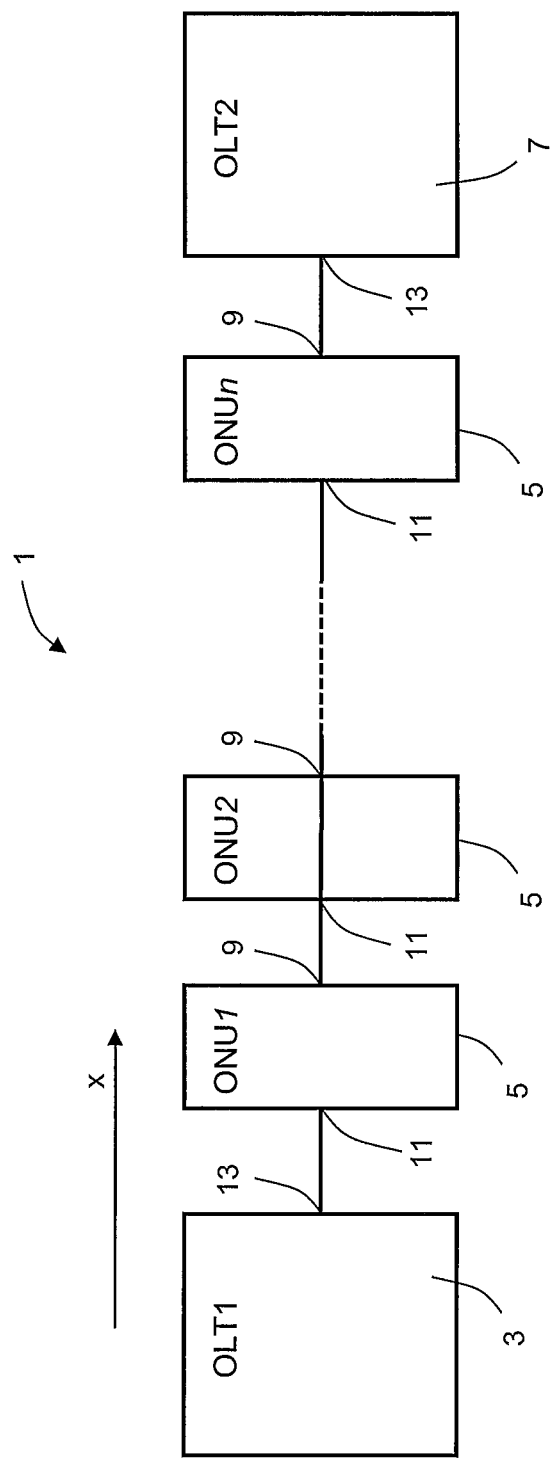
FIG. 1 a schematic block diagram of a fiber-optic network architecture having a linear bus structure and including a central node at both ends of a chain of remote nodes.

FIG. 1 shows a schematic block diagram of a fiber-optic network architecture 1 comprising a western central node 3, also designated as "optical line terminal" OLT1, a plurality of N remote nodes 5, also designated as "optical node units" ONUi with i=1, . . . N, and a second or eastern central node 7, also designated as "optical line terminal" OLT2. The remote nodes 5 are connected in the form of a chain wherein each remote node 5 includes an eastern and western optical connection port 9, 11. The single connection port 13 of the western central node 3 is connected to the western connection port 11 of the first of the remote nodes 5, and the single connection port 13 of the eastern central node 7 is connected to the eastern connection port 9 of the Nth remote node 5. Further, the eastern connection port 9 of a first of two neighboring remote nodes 5 is connected to the western connection port 11 of the second one of the two neighboring remote nodes 5. The respective ports are connected by an optical path which, in general, will be realized as an optical fiber. The remote nodes 5, 7 at both ends of the fiber-optic network architecture 1 shown in FIG. 1 may of course also be physically located at the same place and even be housed in the same casing or rack. In this case, as will become apparent from the below description, the fiber-optic network architecture 1 according to FIG. 1 will assume the form of an open ring-like architecture.

At any rate, the architecture 1 shown in FIG. 1 realizes a path protection. This means, if a predetermined optical node 5 communicates with one of the central nodes 3, 7 and the optical path is interrupted, for example due to an interruption of the optical fiber, the predetermined remote note 5 is still able to communicate with the respective other central node 7, 3. Thus, the desired information may be transmitted to the desired location by replacing the original working path through a protection path. If the two central nodes 3, 7 are both physically present at the same location, an original working path between a given remote node and one of the central nodes may be replaced by a protection path between the respective other connection port of the given remote node and the respective other central node. If the two central nodes 3, 7 are physically present at different locations, the network architecture shown in FIG. 1 is able to realize a portion of the protection path, namely, the portion between the respective other connection port of the respective remote node 5 and the respective other central node 3, 7. The remaining portion between the central node 3, 7 at the end of the protection path realized by the structure according to FIG. 1 may be realized by a further network architecture (not shown) which connects the respective central node 3, 7 to a further central node (not shown) being physically present at the location of the central node at the end of the working path.

Figure 2:
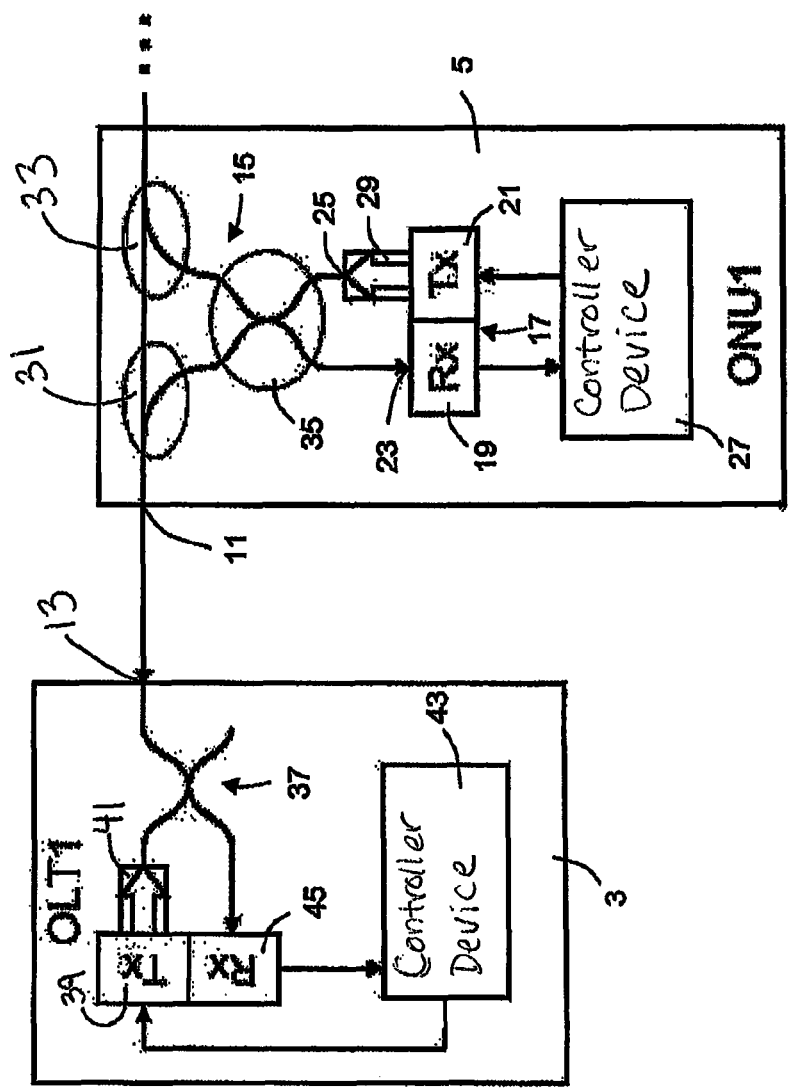
FIG. 2 a schematic block diagram of the western central node and the first remote node of the network in FIG. 1.

As apparent from FIG. 2, the optical path between the two connection ports 13 of the central nodes 3, 7 is a linear bus structure. This linear bus structure is created by an optical connection network 15 included in each of the remote nodes 5, the connection network 15 directly optically connecting the eastern and western connection ports 9, 11.

Each remote node 5 further comprises a transceiver device 17 comprising a receiver unit 19 and a transmitter unit 21. An optical input port of the receiver unit 19 is connected to an internal optical receiving port 23 of the optical connection network 15, and an internal optical transmitting port 25 of the optical connection network 15 is connected to an optical output port of the transmitter unit 21.

The receiver unit 19 of the transceiver device 17 is adapted to receive an optical signal at the respective optical input port and to supply a respective converted (and, as the case may be, electrically processed) electrical signal to a controller device 27.

The transmitter unit 21 is adapted to receive a respective electrical signal from the controller device 27 and to convert (and, as the case may be, electrically and/or optically process) this signal into a corresponding optical signal.

In order to protect the transmitter unit 21 from an optical signal which is guided into the direction of the internal optical transmitting port 25, the transmitter unit 21 comprises an optical isolator 29.

The optical connection network 15 is designed such that it optically connects the eastern and western optical connection ports 9, 11 via an optical pass-through path adapted to pass through a digital optical signal received at the eastern or western optical connection port as digital optical pass-through signal to the respective other optical connection port 11, 9 with at least a portion of the optical power of the received digital optical signal.

In the embodiment according to FIG. 2, the optical connection network 15 comprises two optical 1×2 splitters 31, 33 and an optical 2×2 coupler 35.

A common port of each of the 1×2 splitters is connected to or defines the eastern and western optical connection port 9, 11, respectively. Two first splitting ports of the optical 1×2 splitters are connected to each other so that the pass-through path is created between the eastern and western connection ports 9, 11.

A second splitting port of each of the two 1×2 splitters 31, 33 is connected to a first and a second port of the 2×2 optical coupler 35. A third port of the 2×2 coupler 35 is optically connected to or defines the internal optical receiving port 23 and a fourth port of the 2×2 coupler 35 is connected to or defines the internal optical transmitting port 25 of the optical connection network 15.

As, in case of the remote note according to FIG. 2, the optical splitters 31, 33 and the optical coupler 35 are wavelength-independent components, the remote node 5 is able to receive an optical signal supplied either to the eastern or to the western connection port 9, 11 at the internal optical receiving port 23.

As the 2×2 coupler is preferably realized as a 3 dB coupler, the received signal is guided with the same power portion to the internal optical transmitting port. Therefore, the transmitter unit 21 comprises the optical isolator 29.

It is of course advantageous to use optical 1×2 splitters 31, 33 with an asymmetric splitting ratio. Preferably, the optical power portion of a signal received at the common port is transferred to the first splitting port and thus to the pass-through path with a power portion of at least 90%, preferably with a power portion of at least 95%. This reduces the insertion loss of the pass-through path between the connection ports 9, 11.

In the same way, the remote node 5 according to FIG. 2 is capable of transmitting an optical signal that is supplied to the internal optical transmitting port 25 simultaneously to the eastern and western connection port 9, 11.

Thus, if the original working path between either the eastern or western connection port and the respective central node 3, 7 is interrupted, the communication can be switched to a protection path between the respective other connection port 9, 11 and the respective other central node 3, 7. Of course, if desired, the optical signal created by the transmitter unit 21 can be simultaneously (this means via the working path and protection path) transmitted to the respective central node 3, 7 and also received and processed in the respective central node.

FIG. 2 also shows a schematic structure of the central node 3. Of course, the same structure may be used for realizing the central node 7. The central node 3 comprises a 3 dB 2×2 coupler, a first port of which is connected to the connection port 13. A second port is connected to a transmitter unit 39 which also comprises an optical isolator 41. The transmitter unit 39 may be electrically connected to a controller device 43 being adapted to control the transceiver unit 39 and to receive an electrical receive signal of a receiver unit 45. Of course, as in case of the remote node 5, the transmitter unit 39 and the receiver unit 45 can be combined to a transceiver unit. The receiver unit 45 is adapted to receive an optical signal from a third port of the optical 3 dB 2×2 coupler 37 and to convert the optical signal into a corresponding electrical signal. Of course, as the case may be, the receiver unit 45 may be able to further process the electrical signal, for example to electrically regenerate the received signal.

In the following, the communication between a central node and a predetermined remote note is explained with reference to FIG. 3.

Figure 3:
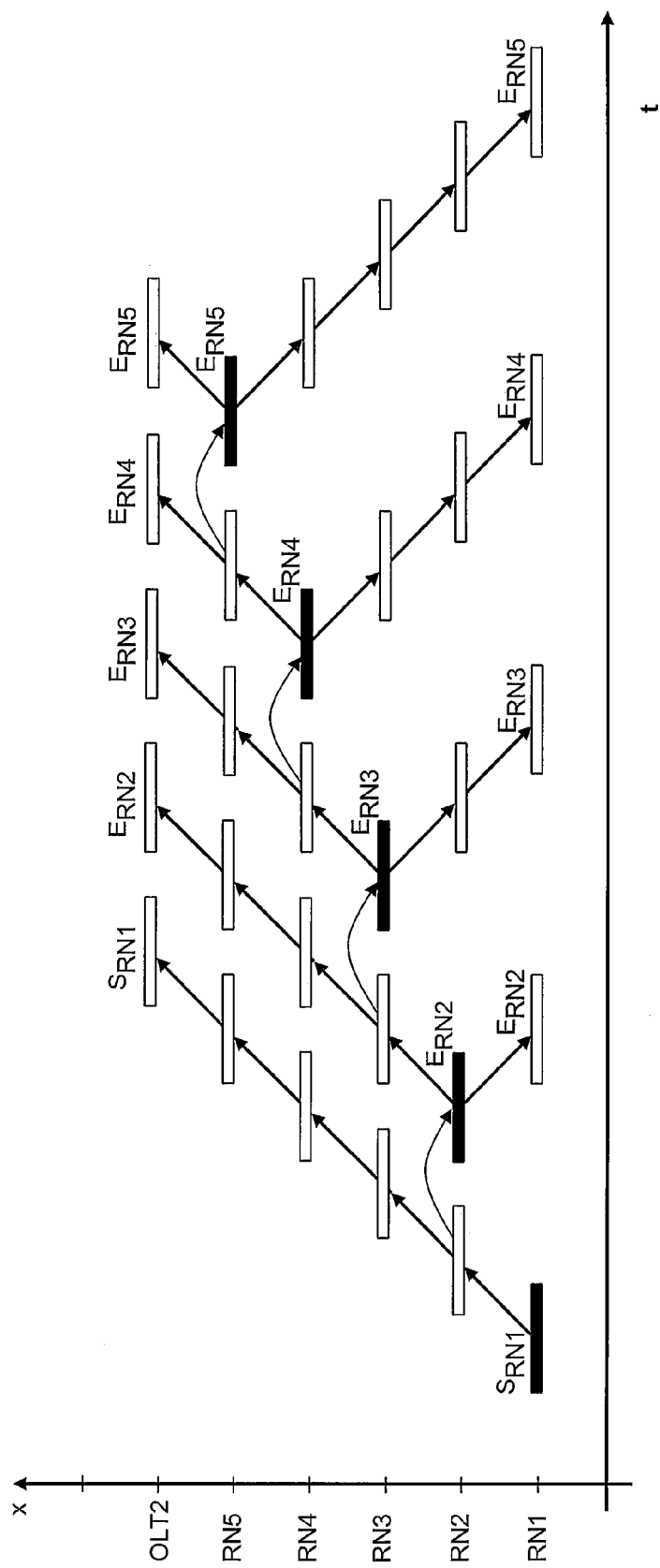
FIG. 3 a schematic diagram showing the principle of transmission of burst-like and frame-based digital optical signals within a network architecture according to FIG. 1 comprising only a single central node and five remote nodes.
Figure 4:
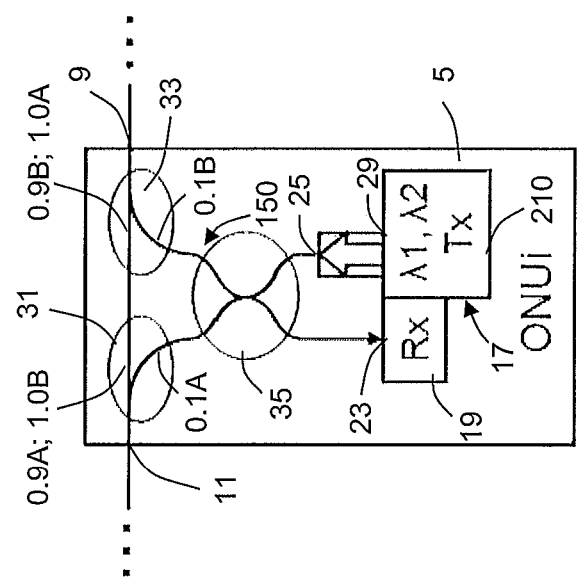
FIG. 4 a schematic block diagram of a further embodiment of a remote node comprising a dual wavelength transmitter unit.

In order to facilitate the communication and to fully make use of the advantages of the simple remote node structure according to FIG. 4 used for a transmission architecture 1 according to FIG. 1, burst-like optical signals comprising a data frame are used. Each of the horizontal bars depicted in FIG. 3 represents a data frame of a digital optical signal (or, if converted into an electrical signal, of a digital electrical signal) including content data and address data. As the network architecture according to FIG. 1 is a bus structure, it is necessary to include address data within the data frames of each optical or electrical signal in order to enable a receiving node (central node 3, 7 or remote node 5) to decide whether a received signal shall be further processed or treated as a receive signal addressed to the respective node or whether the signal shall be treated otherwise or simply be ignored.

The horizontal axis in FIG. 3 is the time axis, whereas the vertical axis represents the position of each node. The example according to FIG. 3 assumes that five remote nodes are present in the bus structure according to FIG. 1 and that a signal created in the remote node RN1 shall be transmitted to the eastern central node OLT2.

The filled bars in FIG. 3 represent signals that are created in the respective node. The empty bars represent signals that are passed-through through the respective node.

The first (left) series of bars shows the transmission of a transmit signal $S_{RN1}$ created in the first remote node 5 (RN1). This signal is passed through each of the remote nodes 5 in the transmission path between the first remote node RN1 and the eastern central node 7 (OLT2), the pass-through signals at the location of the respective nodes being represented by the empty bars in FIG. 3.

As explained above, the signal $S_{RN1}$ is not only passed through the second remote node RN2, but also received at the respective internal optical receiving port 23. The controller device 27 receives the received signal $S_{RN1}$ and creates an echo data frame comprising the same content and address data as the received signal. The controller device controls the transmitter unit 21 of the second remote node RN2 such that a respective echo signal $E_{RN2}$ is created and sent (also) in direction of the addressed central node OLT2.

The second series of signals represented by a filled and four empty bars connected by arrows represents the transmission of the echo signal $E_{RN2}$ from the remote node RN2 to the central node OLT2.

This procedure is repeated in each of the remote nodes RN3 to RN6. However, as each further remote node not only receives the transmit signal $R_{RN1}$, but also each of the previously created echo signals $E_{RN2}$ to $E_{RN5}$, it must be decided in each of the remote nodes which of the received signals forms the basis of the echo signal to be created. Preferably, as indicated by the curved arrows in FIG. 3, the last echo signal received forms the basis of the creation of the respective further echo signal in the respective remote node RN2 to RN6. For this purpose, each controller device may detect whether the signal just received is a signal created at the neighboring remote node upstream of the signal transmission path. If not, the controller device may wait until the next (or last) signal is received (this means, until the signal from the directly neighboring node is received) and then use this signal for creating the respective echo signal. Alternatively, the controller device 27 may, after receipt of the last signal, wait until a predetermined time interval without receiving a further signal has lapsed before creating a further echo signal on the basis of the signal received last. The predetermined time interval to be awaited before the respective echo signal is created is of course dependent on the signal propagation delays between the individual neighboring nodes. If an echo signal shall be created (as is assumed in the embodiment of a transmission procedure according to FIG. 3), the time interval depends on the maximum propagation delay between two neighboring nodes in the chain of nodes according to FIG. 1.

As the structure of a remote node 5 according to FIG. 2 simultaneously transmits an optical signal created in the remote node 5 in both directions, it is advantageous that each node creating a transmit or echo signal marks the signal as being created in the respective node. This might be done by including a respective information in the data frame of the transmit or echo signals.

In this way, it can be avoided that an infinite loop of creating echo signals arises. FIG. 3 shows that an echo signal, for example the echo signal $E_{RN3}$ created in the third remote node is not only received at the fourth remote node RN4, but also in the second remote node RN2 (this means the signal is transmitted in the opposite direction). As the signal $E_{RN3}$, which is received at the second remote node 2, bears a mark within the data frame showing that the signal was created in the remote node RN2, the controller device 27 within the remote node RN2 decides not to create an echo signal again.

The echo signal $R_{RN3}$ is of course also received at the remote node RN1 due to the pass-through path in each remote node. However, as this signal also bears a mark within the data frame showing that the original signal $S_{RN1}$ has been created by the remote node RN1, the controller device 27 within the remote node RN1 decides not to create a further echo signal. In other words, if the controller device in a remote node detects that the data frame was created or already echoed by the remote node itself, no further echo signal is created.

In the receiving node, the central node OLT2 in the example according to FIG. 3, the controller device decides which of the signals received (here: the signals $S_{RN1}$ and $E_{RN2}$ to $E_{RN6}$) shall be treated as receive signal. For example, the signal revealing the best signal quality might be elected as receive signal. For this purpose, the controller device or the receiver unit may detect a parameter which is directly or indirectly linked to the signal quality. For example, the signal received with the best signal-to-noise ratio or the signal received with the highest optical power level might be elected as receive signal.

Similarly, it might be decided within a remote node 5 whether it is necessary to create an echo signal. For this purpose, the controller device 27 may detect a parameter linked to the signal quality, for example the optical power of the signal (transmit or echo signal) received. If this parameter is below a predetermined threshold level, the controller device creates an echo signal as described above. Of course, it is preferable to detect the signal quality of the signal which is received last within a series of one or more signals consisting of the original transmit signal and one or more echo signals based on the respective transmit signal.

In this respect, it is to be noted that the controller device 27 of a remote node 5 may of course comprise a suitable controller hardware and a controller software in order to realize all the controlling functions described.

By creating echo signals if the signal quality of the signal received last is below a given threshold value, the number of echo signals can be drastically reduced. As a result, time slots for transmitting further signals over the same transmission path may be kept free and used for transmitting further signals.

This method shall be explained again with reference to the scheme according to FIG. 3. If it is assumed that, for example, the echo signal $E_{RN2}$ which is received as a last signal in the series of signals consisting of the signals $S_{RN1}$ and $E_{RN2}$ at the remote node RN3 reveals a sufficiently high signal quality, the controller device 27 of the remote node RN3 will decide that it is not necessary to create a further echo signal $E_{RN3}$. Thus, instead of creating an echo signal, the remote node RN3 is free to use this time slot for creating a transmit signal $S_{RN3}$ which might be addressed to one of the central nodes 3, 7 or OLT1, OLT 2, respectively. As explained above, it is even possible that the remote node addresses a further remote node.

Thus, by reducing the number of echo signals (as compared to the example according to FIG. 3 in which each of the remote nodes creates an echo signal irrespective of the signal quality), the capacity of the respective network architecture may be used more effectively.

Instead of detecting the signal quality of a signal received last at a remote node and making the decision as to whether or not an echo signal shall be created if the signal quality is insufficient, the controller device 27 of a remote node 5 may detect at which previous node the signal was "treated" (i.e. transmitted or echoed) last. Depending on this information, the controller device 27 may decide whether it is necessary to echo the signal in order to guarantee that the signal can be received with a sufficient signal quality at a predetermined further remote node downstream the transmission path or at the addressed central node 3, 7. The information necessary to make this decision can of course be stored within the controller device 27 of the respective remote node 5.

Of course, the transmitting of a transmit signal from the central node OLT2 to the first remote node is effected correspondingly.

If the transmission path between the first remote node RN1 and the central node OLT2 is interrupted, a communication between the remote node RN1 and the first central node OLT1 may be established, the respective transmission path serving as protection path. If, as described above, the central node OLT1 is provided at the same location as the central node OLT2 no further transmission path is necessary. If not, a further transmission path (not shown) may be used for transmitting the signals from the location of the node OLT1 to the node OLT2, the further transmission path being part of the protection path.

A further embodiment of a remote node structure is shown as a schematic block diagram in FIG. 4. This type of remote note 5 comprises a transmitter unit 210 capable of transmitting an optical signal at two wavelengths λ1, λ2. The transmitter unit may either create the optical signal at both wavelengths λ1, λ2 simultaneously or may be controllable to create the optical signal either at the wavelength λ1 or at the wavelength λ2. For reasons of simplicity, in FIG. 4 the controller device for controlling the transceiver unit 19 consisting of the receiver unit 19 and the transmitter unit 210 have been omitted. The controller device is, however, comprised by the remote node structure 5 according to FIG. 4 and is adapted to effect all necessary control functions as explained above and will be explained in the following.

The main difference between the remote node structure 5 according to FIG. 4 and the structure of a remote node according to FIG. 2 as explained above is the use of a dual wavelength transmitter unit 210 and the use of a wavelength-dependent optical connection network 150. The connection network 150 consists of an optical 1×2 splitter 310 comprising a common port being connected to or defining the western connection port 11 and a first splitting port connected to a first splitting port of a further wavelength-dependent optical 1×2 splitter 330 having a common port connected to or defining the eastern connection port 9. The second splitter ports of the wavelength-dependent optical 1×2 splitters 310 and 330 are connected to a first and a second port of a wavelength-independent optical 3 dB coupler 35. As is the case with the structure according to FIG. 2, the third and fourth ports of the coupler 35 are connected to the optical input port of the receiver unit 19 and the optical output port of the transmitter unit 210. The connection of the receiver unit 19 and the transmitter unit 210 to the optical connection network 150 is again effected at the internal optical receiving port 23 and the internal optical transmitting port 25 of the optical connection network 150.

The wavelength-dependent 1×2 splitter 310 is designed such that it transmits all wavelengths within a first wavelength band A with a power portion of 0.9 or 90% and all wavelengths within a second wavelength band B with a power portion of almost 1.0 or 100%. The other power portion of 0.1 of a signal having a wavelength within the first band A is supplied to the second port of the 1×2 splitter 310 so that the signal can be received at the internal optical receiving port 23 by the receiver unit 19.

Similarly, the optical 1×2 splitter 330 transmits an optical signal supplied at the eastern connection port 9 to almost 100% or with a power portion of almost 1.0 to the first splitting port which is connected to the first splitting port of the 1×2 splitter 310, if the optical signal reveals a wavelength within the first wavelength band A. If the optical signal was created at a wavelength within the band B, it is transmitted to the first splitting port of the 1×2 splitter 330 with a power portion of 0.9 or 90%. In this case, a power portion of 0.1 or 10% is supplied to the second splitting port of the splitter 330 so that this signal supplied from the east side of the remote node 5 can be received by the receiver unit 19.

Figure 5:
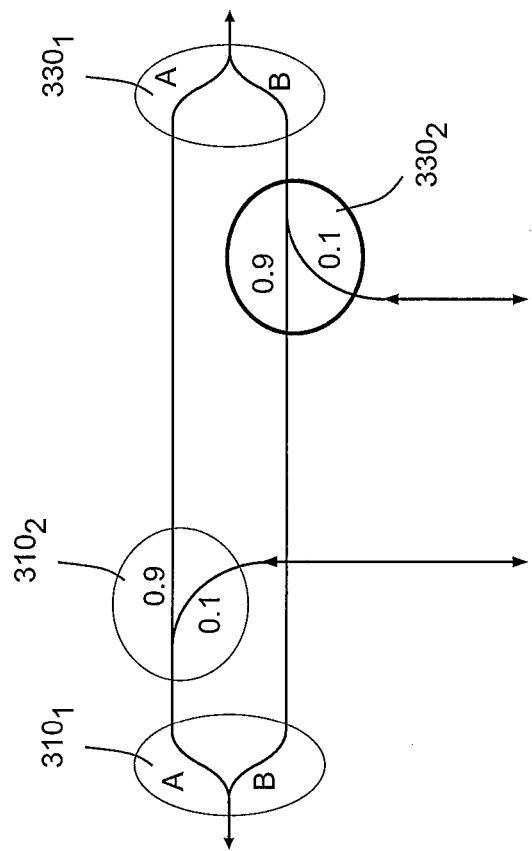
FIG. 5 a schematic equivalent network of a wavelength-dependent optical pass-through and tapping-off structure for the connection network included in a remote node.

FIG. 5 shows an equivalent circuit diagram for the 1×2 splitters 310 and 330 in FIG. 4. Each of the splitters 310, 330 may be realized as a first wavelength-dependent 1×2 splitter $310_1$ and $330_1$, respectively, and a further 1×2 splitter $310_2$ and $330_2$. Each of the splitters $310_1$ and $330_1$ are wavelength-dependent 1×2 splitters which fully separate signals lying in the first band A and the first band B, respectively. The output ports for signals in the band A and for signals in the band B are connected by the further 1×2 splitters $310_2$, $330_2$, respectively.

The splitters $310_2$ and $330_2$ are wavelength-independent 1×2 splitters transmitting a signal in the respective connection part with a power portion of 0.9 or 90%, respectively, and splitting off a power portion of 0.1 or 10%. The second splitting ports of the splitters $310_2$, $330_2$ are connected to the first and second port of the 2×2 coupler 35 in FIG. 4, respectively.

In this way, the optical connection network 150 in FIG. 4 may be realized by using conventional and easy-to-manufacture optical components. However, it might be preferable to use integrated optical splitters 310, 330 having the desired wavelength-dependent splitting ratios in the respective bands A, B.

It is to be understood that the splitting ratios of the splitters 310, 330 of 0.9 and 0.1 in the respective bands A, B are only chosen as example values. In practice, optimized values for a given network structure may be adjusted. For example, a value of 0.95 or 0.97 may be used in order to further reduce the insertion loss for signals passed through in the respective band.

As is apparent from the structure in FIGS. 4 and 5, only optical signals in the respective band may be received from the eastern or western side of the remote node 5. If a controllable transmitter unit 210 is used, the controller device 27 may select to which side of the remote node a respective optical signal (transmit or echo signal) is to be transmitted. With the structure given in FIG. 4, a signal at the wavelength $\lambda_1$ which lies in the wavelength band A can only be transmitted to the western side of the remote node 5, and a signal λ2 which lies within the wavelength band B can only be transmitted to the eastern side.

Thus, if a remote node 5 shall communicate with a central node 3, 7, the central node needs the information which wavelength band can be received by the respective remote node 5 so that the central node 3, 7 can transmit the optical signal at the desired wavelength λ1, λ2.

In order to enable a communication between a central node and a given remote node, it might be necessary to create one or more echo signals by remote nodes lying within the communication path between the central node 3, 7 and the given remote node 5. For this purpose, it is necessary to use remote nodes 5 according to the structure shown in FIG. 4 in two different types with respect to the connection network 150. A first type might be chosen as shown in FIG. 4, and a second type reveals the inverse wavelength dependence, that means the behavior of the splitters 310 and 330 is exchanged with respect to the bands A, B, respectively. This is necessary as a remote node 5 having the structure according to FIG. 4 can only create an echo signal having the respective other wavelength as compared to the signal received. If such a wavelength conversion is effected, it might happen that the remote node addressed by the optical transmit signal or optical echo signal might not be capable of receiving the optical signal if the signal is fed to the respective connection port at the wrong wavelength.

In order to establish a communication between a central node and a given remote node, it is still necessary that the central node transmits the optical signal at a wavelength λ1, λ2 chosen such that, taking into account wavelength conversion effected when echo signals are created, the transmit signal and/or at least one echo signal can be received by the remote node addressed.

Of course, a central node 3, 7 may also transmit optical signals at two wavelengths, for example by modulating an optical signal having a spectrum including two wavelengths in the desired way. However, the problem remains that optical nodes within the transmission path to the remote node 5 addressed are capable of creating echo signals either at the wavelength λ1 or at the wavelength λ2, only. Creating an optical echo signal at a wavelength which cannot be received by the remote node 5 addressed is of no use.

A desired structure for a network architecture as generally shown in FIG. 1 may be chosen such that every second or every n-th remote node might be of the structure with a type 1 connection network, and the other remote nodes 5 include a type 2 connection network (as generally shown in FIGS. 4 and 5).

At any rate, the invention including the data transmission method using pass-through signals and additional echo signals enables the design of an optical transmission network architecture having a linear bus structure with a high number of network nodes. The invention further enables the use of network nodes having a simple design. Thus, especially a sensor network can be realized and maintained at low costs.

LIST OF REFERENCE SIGNS 1 fiber-optic network architecture
3 western central node (OLT1)
5 remote node
7 eastern central node (OLT2)
9 eastern optical connection port
11 western optical connection port
13 connection port of OLTi
15 optical connection network
17 transceiver device
19 receiver unit
21 transmitter unit
23 internal optical receiving port
25 internal optical transmitting port
27 controller device
29 optical isolator
31 optical 1×2 splitter
33 optical 1×2 splitter
35 optical 2×2 coupler
37 optical 2×2 coupler
39 transmitter unit of OLTi
41 optical isolator of OLTi
43 controller device of OLTi
45 receiver unit of OLTi
150 wavelength-dependent optical connection network
210 dual wavelength transmitter unit
310 wavelength-dependent optical 1×2 splitter
$310_1$ optical band splitter
$330_2$ wavelength-independent 1×2 splitter
330 wavelength-dependent optical 1×2 splitter
$330_1$ optical band splitter
$330_2$ wavelength-independent 1×2 splitter

The invention claimed is:

1. A remote node architecture for a fiber-optic network, especially for low bit-rate data transmission, the fiber-optic network comprising a central node and a plurality of remote nodes serially connected to each other and to the central node, respectively, the central node and the plurality of remote nodes being capable of communicating by means of digital optical signals created by the central node or one of the plurality of remote nodes, each digital optical signal comprising a data frame, (a) a first remote node of the plurality of remote nodes comprising an optical connection network, a single transceiver device comprising an optical receiver unit and an optical transmitter unit, and a controller device for controlling the transceiver device,
(b) the optical connection network defining a western optical connection port, an eastern optical connection port, an internal optical receiving port being connected to the optical receiver unit and an internal optical transmitting port being connected to the optical transmitter unit, the western and eastern optical connection ports being connected via an optical pass-through path for passing through a digital optical signal received at the western or eastern optical connection port as digital optical pass-through signal to the respective other optical connection port with at least a portion of an optical power of the received digital optical signal, and
(c) the controller device, the transceiver device and the optical connection network being configured such that
   (i) for transmitting information from the first remote node to the central node, the controller device creates a first data frame including content data supplied to the controller device and address data for addressing the central node and controls the optical transmitter unit such that a digital optical transmit signal according to the data frame is created, the digital optical transmit signal being supplied at least to the optical connection port facing the central node,
   (ii) for receiving information from the central node, the receiver unit receives a digital optical transmit signal created by the central node or a digital optical echo signal created by a second remote node of the plurality of remote nodes, which is supplied to the western or eastern optical connection port and which comprises a second data frame including content data and address data for addressing the second remote node, with at least a given power portion at the internal optical receiving port, and the controller device processes the second data frame, and
   (iii) for regenerating a digital optical transmit or echo signal received, the receiver unit receives a digital optical transmit signal created by the central node or the first remote node or a digital optical echo signal created by the second remote node, which is supplied to the western or eastern optical connection port and which comprises a third data frame including content data and address data not addressing the first remote node, with at least a given power portion at the internal optical receiving port, the controller device creates an echo data frame including the same content and address data as the received third data frame and controls the optical transmitter unit such that an additional digital optical echo signal according to the echo data frame is created immediately or after a predetermined time interval after the end of the third data frame of the received optical signal, the additional digital optical echo signal being output at the respective other optical connection port or at both optical connection ports.

2. The remote node architecture according to claim 1, wherein the optical connection network exclusively comprises passive optical components and defines
   (a) a western optical receiving path for supplying the digital optical signal received at the western optical connection port to the internal optical receiving port with a given portion of the optical power of the received digital optical signal, and an eastern optical receiving path for supplying the digital optical signal received at the eastern optical connection port to the internal optical receiving port with a given portion of the optical power of the received digital optical signal, and (b) a western optical transmitting path for supplying a digital optical signal received at the internal optical transmitting port to the western optical connection port with at least a given portion of the optical power, and an eastern optical transmitting path for supplying a digital optical signal received at the internal optical transmitting port to the eastern optical connection port with at least a given portion of the optical power.

3. The remote node architecture according to claim 1, wherein the controller device creates a digital optical echo signal, if, after having received a digital optical transmit or echo signal, no digital optical transmit or echo signal is received within a predetermined time interval after the end of the digital optical signal received last, or if the controller device detects that the digital optical transmit or echo signal received last was created by a directly neighboring remote node of the plurality of remote nodes or by the central node.

4. The remote node architecture according to claim 1, wherein the controller device creates a digital optical echo signal for each digital optical transmit or echo signal received last in a series of one or more received digital optical transmit or echo signals having the same content data, only.

5. The remote node architecture according to claim 2, wherein the western and eastern optical transmitting paths and the pass-through path have an essentially wavelength-independent characteristic and are linked and configured in such a way that an optical transmit or echo signal supplied to the internal optical transmitting port is simultaneously supplied, with a respective portion of the optical power, to both the western and eastern optical connection ports.

6. The remote node architecture according to claim 2, wherein the western and eastern optical receiving path and the pass-through path have an essentially wavelength-independent characteristic and are linked and configured in such a way that an optical transmit or echo signal supplied to the western or eastern optical connection port is simultaneously supplied, with a respective portion of the optical power, to the internal optical receiving port.

7. The remote node architecture according to claim 5, wherein the optical connection network comprises two optical 1×2 splitters, each having a common port and a first and a second splitting port, and a 2×2 optical coupler, the common ports of the optical 1×2 splitters defining or being connected to a respective one of the optical connection ports, the two first splitting ports of the optical 1×2 splitters being connected to each other and each of the second splitting ports of the optical 1×2 splitters being connected to a respective first and second port of the optical 2×2 coupler, a third and a fourth port of the optical 2×2 coupler defining or being connected to the internal optical receiving port and the internal optical transmitting port, respectively, the optical 2×2 coupler preferably being a 3 dB coupler.

8. The remote node architecture according to claim 5, wherein the controller device marks the data frame of the digital optical transmit signal created by the first remote node and the created echo data frame of a digital optical echo signal created by the first remote node as being a data frame or an echo data frame created or echoed by the first remote node, and wherein the controller device does not create a digital optical echo signal if it detects, when receiving a digital optical signal which is not addressed to the first remote node, that the respective data frame was created or already echoed by the first remote node itself.

9. The remote node architecture according to claim 2, wherein the western and eastern optical transmitting paths, the western and eastern optical receiving paths and the optical pass-through path have a wavelength-dependent characteristic such that (a) a digital optical transmit or echo signal supplied to the western optical connection port is passed through to the eastern optical connection port without being supplied to the internal optical receiving port if the signal supplied lies within a first wavelength band, (b) a digital optical transmit or echo signal supplied to the western optical connection port is passed through to the eastern optical connection port with a given first power portion and simultaneously supplied to the internal optical receiving port with a given second power portion if the signal supplied lies within a second wavelength band, (c) a digital optical transmit or echo signal supplied to the eastern optical connection port is passed through to the western optical connection port without being supplied to the internal optical receiving port if the signal supplied lies within the second wavelength band, (d) a digital optical transmit or echo signal supplied to the eastern optical connection port is passed through to the western optical connection port with a given first power portion and simultaneously supplied to the internal optical receiving port with a given second power portion if the signal supplied lies within a first wavelength band, (e) a digital optical transmit signal being created by the transmitter unit at the first wavelength and supplied to the internal optical transmitting port is supplied to the eastern optical connection port, only, and (f) a digital optical transmit signal being created by the transmitter unit at the second wavelength and supplied to the internal optical transmitting port is supplied to the western optical connection port, only.

10. The remote node architecture according to claim 9, wherein the transmitter unit is controllable to create an optical signal at a first wavelength lying within the first wavelength band and a second wavelength lying within the second wavelength band and wherein the controller device controls the transmitter unit such that (a) a transmit signal is created at the first wavelength if the transmit signal is addressed to the central node or a third remote node of the plurality of remote nodes lying east of the first remote node and the transmit signal is created at the second wavelength if the transmit signal is addressed to the central node or a fourth remote node of the plurality of remote nodes lying west of the first remote node, (b) an echo signal for a transmit or echo signal at the second wavelength being supplied to the western optical connection port and thus supplied to and received at the internal optical receiving port is created at the first wavelength and thus supplied to the eastern optical connection port, and (c) an echo signal for a transmit or echo signal at the first wavelength being supplied to the eastern optical connection port and thus supplied to and received at the internal optical receiving port is created at the second wavelength and thus supplied to the western optical connection port.

11. The remote node architecture according to claim 1, wherein the controller device detects the optical or electrical signal quality of a received signal by evaluating one or more parameters linked to the optical or electrical signal quality and creates an echo data frame if the signal quality is below a predefined threshold value, the parameters for the signal quality preferably being one of the optical or electrical signal power, the bit error rate or the existence of a coding violation.

12. A fiber-optic network architecture, especially for a fiber-optic sensor network requiring low data transmission bit-rates, comprising:
(a) a central node including an optical connection port and a plurality of remote nodes, each remote node including a western and eastern optical connection port, the central node and the plurality of remote nodes connected in series to each other,
(b) the central node and each of the plurality of remote nodes being capable of communicating by means of digital optical signals created by the central node or one of the plurality of remote nodes, each digital optical signal comprising a data frame, wherein
(c) each of the remote nodes comprises:
an optical connection network, a single transceiver device comprising an optical receiver unit and an optical transmitter unit, and a controller device for controlling the transceiver device,
the optical connection network defining a western optical connection port, an eastern optical connection port, an internal optical receiving port being connected to the optical receiver unit and an internal optical transmitting port being connected to the optical transmitter unit, the western and eastern optical connection ports being connected via an optical pass-through path for passing through a digital optical signal received at the western or eastern optical connection port as digital optical pass-through signal to the respective other optical connection port with at least a portion of an optical power of the received digital optical signal, and
the controller device, the transceiver device and the optical connection network being configured such that
(i) for transmitting information from the a first remote node of the plurality of remote nodes to the central node, the controller device creates a first data frame including content data supplied to the controller device and address data for addressing the central node and controls the optical transmitter unit such that a digital optical transmit signal according to the data frame is created, the digital optical transmit signal being supplied at least to the optical connection port facing the central node,
(ii) for receiving information from the central node, the receiver unit receives a digital optical transmit signal created by the central node or a digital optical echo signal created by a second remote node of the plurality of remote nodes, which is supplied to the western or eastern optical connection port and which comprises a second data frame including content data and address data for addressing the second remote node, with at least a given power portion at the internal optical receiving port, and the controller device processes the second data frame, and
(iii) for regenerating a digital optical transmit or echo signal received, the receiver unit receives a digital optical transmit signal created by the central node or the first remote node or a digital optical echo signal created by the second remote node, which is supplied to the western or eastern optical connection port and which comprises a third data frame including content data and address data not addressing the first remote node, with at least a given power portion at the internal optical receiving port, the controller device creates an echo data frame including the same content and address data as the received third data frame and controls the optical transmitter unit such that an additional digital optical echo signal according to the echo data frame is created immediately or after a predetermined time interval after the end of the third data frame of the received optical signal, the additional digital optical echo signal being output at the respective other optical connection port or at both optical connection ports.

13. The fiber-optic network architecture according to claim 12, wherein the network architecture comprises a second central node comprising an optical connection port connected to a last one of the plurality remote nodes that are serially connected.

14. The fiber-optic network architecture according to claim 13, wherein the two central nodes are provided at the same location so that the network architecture forms an open ring architecture providing fiber protection.

15. The fiber-optic network architecture according to claim 12, wherein the type of each of the remote nodes within the series of remote nodes is chosen such that an echo signal can be created at one or more predefined node locations when transmitting a data frame from a specified remote node to the first or second central node or vice versa.

16. A method for transmitting digital data in a fiber-optic network, especially for low bit-rate data transmission, the network comprising a central and a plurality of remote nodes serially connected to each other and to the central node by means of a fiber-optic path, respectively, forming a fiber-optic bus structure, the method comprising the steps of:
(a) for transmitting information from a first selected remote node to the central node:
(i) creating, in the first selected remote node, a digital optical transmit signal addressed to the central node comprising a data frame and outputting the digital optical signal to the fiber-optic path at least in the direction to the central node,
(ii) passing the digital optical signal through each of the remote nodes in the path between the first selected remote node and the central node,
(iii) receiving, in at least one of the remote nodes in the path between the first selected remote node and the central node, the digital optical transmit signal and, as the case may be, one or more echo signals created by other remote nodes in the path between the first selected remote node and the at least one remote node,
(iv) creating, in the at least one remote node an echo signal comprising a data frame including the same information to be transmitted as the digital optical transmit signal or the echo signal received last based on the transmit signal and outputting the echo signal to the fiber-optic path at least in the direction to the central node, and
(v) receiving, at the central node, the transmit signal and the echo signal or the echo signal, only, and
(b) for transmitting information from the central node to a second selected remote node:
(i) creating, in the central node, a digital optical transmit signal addressed to the second selected remote node comprising a data frame and outputting the digital optical signal to the fiber-optic path at least in the direction to the second selected remote node,
(ii) passing the digital optical signal through each of the remote nodes in the path between the central node and the second selected remote node,
(iii) receiving, in at least one of the remote nodes in the path between the central node and the second selected remote node, the digital optical transmit signal and, as the case may be, one or more echo signals created by other remote nodes in the path between the central node and the at least one remote node,
(iv) creating, in the at least one remote node an echo signal comprising a data frame including the same information to be transmitted as the transmit signal or the echo signal received last based on the transmit signal and outputting the echo signal to the fiber-optic path at least in the direction to the at least one remote node, and
(v) receiving, at the central node, the transmit signal and the echo signal or the echo signal, only.

* * * * *